July 25, 1967 K. F. SEARLE ETAL 3,333,060

DISTRIBUTION SYSTEM FOR TELEVISION PULSE WAVEFORMS

Filed Nov. 18, 1963

Inventors
K. F. Searle
L. A. Spong
By
Holcombe, Wetherill & Brisebois
Attorney 3,333,060

DISTRIBUTION SYSTEM FOR TELEVISION PULSE WAVEFORMS

Kenneth Frederick Searle and Leslie Arthur Spong, London, England, assignors to Associated Television Limited, London, England, a British company Filed Nov. 18, 1963, Ser. No. 324,450
Claims priority, application Great Britain, Nov. 19, 1962, 43,647/62
18 Claims. (Cl. 178—69.5)

Figures 1, 2:
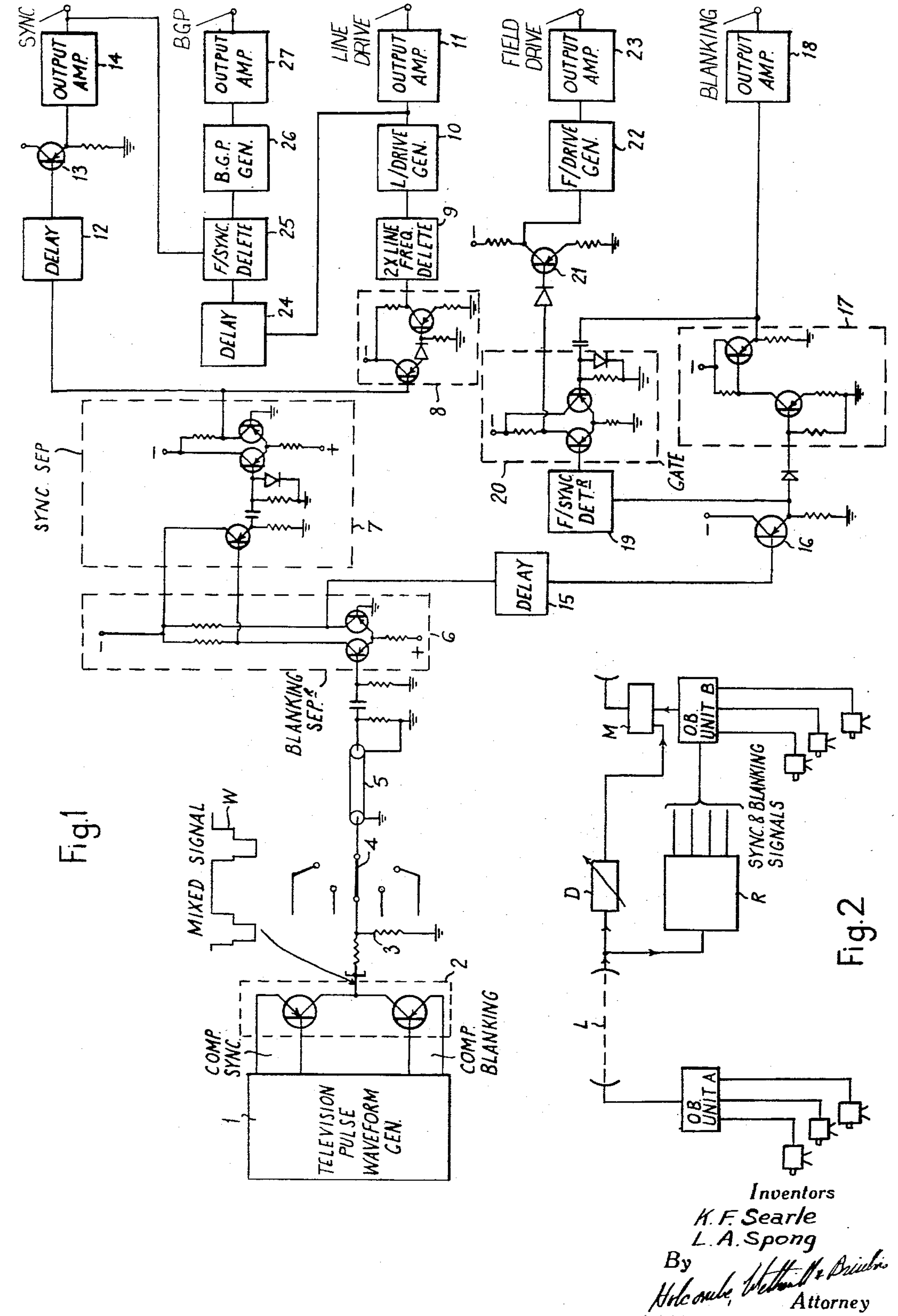

In television studios and other locations where television picture signals are produced, it is necessary to provide for the distribution of synchronising and blanking pulse waveforms from one or more waveform generators to the numerous items of television equipment such as cameras, recording apparatus, telecine machines and monitors which are used in the production of the television picture signals. The television systems at present in use require that each waveform generator provides at least four pulse waveforms for the operation of the picture generating equipment. For monochrome television systems, these pulse waveforms respectively comprise line drive pulses, field drive pulses, mixed synchronising pulses and mixed blanking pulses. For colour television signals, additional timing pulses may be necessary.

Moreover in most centres for the production of television pictures it is now necessary to provide these television pulse waveforms at a plurality of different scanning standards by reason of the increasing interchange of television programmes and material between countries having different television standards and hence the necessity to generate the television pictures according to the various different standards. It is therefore commonly desired, for example, to provide television pulse waveforms according to the 405 line standard, the 525 line standard and the 625 line standard to each studio or picture producing unit and all of these scanning standards may be in use simultaneously in one studio or location. It is also sometimes required to make adjustments to television pulse waveform generators whilst they are feeding a particular studio or piece of equipment without these adjustments affecting other equipment to which the pulse waveform is to be fed. In order to provide for this facility it is generally necessary to provide more than one television pulse waveform generator for each of the scanning standards which is to be distributed to the various studios and picture generating units.

It is therefore a major problem involving large amounts of cable and complex switching and distribution equipment, particularly in a large television centre where six or more television waveform generators may be employed operating at two or more different scanning standards, to distribute each of the four or more synchronising and blanking pulse waveforms from each of the waveform generators to any or all of the various positions at which they are required.

It is accordingly an object of the present invention to provide a system which simplifies the distribution of television pulse waveforms, particularly from a plurality of pulse waveform generators some of which may operate on different scanning standards to the others, to the various positions in a group of television studios or other television picture generating units where they may be required.

From one aspect, the invention provides a system for the distribution of television pulse waveforms wherein the various synchronising and blanking pulses required, or timing pulses representing the leading edges of the synchronising and blanking pulses, are formed into a combined pulse waveform and are distributed to a plurality of positions at each of which the pulses are required, and means provides at each of said positions for separating and/or regenerating the synchronising and blanking pulses required at that position from the pulses of the combined waveform.

From another aspect, the invention provides a system for the distribution of plural trains of composite pulses which are representative of one or more television scanning standards and each of which comprises the various synchronising and blanking pulses required, or timing pulses representing the leading edges of these synchronising and blanking pulses, wherein these trains of pulses are selectively fed to a plurality of positions each of which includes means for separating constituent pulses from the selected combined pulse train and means for producing synchronising and blanking pulses according to the television standards of the selected train of pulses.

According to a feature of the invention, instead of distributing the synchronising and blanking pulses, the combined trains of pulses comprise timing pulses representative of the leading edges of the synchronising and blanking pulses, and the synchronising and blanking pulses of the correct duration are produced at each of the required positions by means of pulse regenerating circuits. Morevover it has been found by analysis of the 405, 525 and 625 line scanning standards that although the duration of the line and field drive signals differ between standards, there is no fundamental objection to using one common pulse duration for each of these siganls on all of the scanning standards without producing any undesirable effect on the synchronisation of the picture generating equipment, provided that the leading edge of each timing pulse is correctly located in relation to the remainder of the pulses.

The four pulse trains required by the picture generating equipment, namely line drive pulses, field drive pulses, the mixed synchronising pulse train and the mixed blanking pulse train, or the series of timing pulses representative of these pulse trains may be added in a simple manner to form the combined television pulse waveform for distribution to the various positions at which it is required.

The desired combined television pulse waveform is selected from the various waveform generators by switch means, which may be a mechanical switch, an electromechanical switch, or an electronic switch, such as a diode arrangement. At each regenerator circuit the synchronising pulses and blanking pulses, or the timing pulses representative of these, are separated from each other and the separated synchronising pulses or the timing pulses representative of the leading edges of these pulses are employed to produce the line drive pulses and the mixed synchronising pulse waveform. The separated blanking pulses or triggering pulses representative of the leading edges of these pulses are employed to produce the field drive pulses and the mixed blanking pulses. In the case of a colour television waveform, a train of additional timing pulses or burst gating pulses may be produced from the line drive pulses and the mixed synchronising pulses.

Besides its application for the distribution of television pulse waveforms through television studios and other picture generating centres, the system according to the present invention may be employed with outside broadcast equipment in order to facilitate synchronisation between the television cameras and other television picture generating equipment of two or more outside broadcast units.

From yet another aspect, therefore, the present invention provides a system for achieving synchronisation between two or more television picture generating units such as outside broadcast units, each unit having one or more television cameras or other television picture generating equipment, wherein a television pulse waveform generator is provided at one picture generating unit and a combined television pulse waveform from this unit comprising synchronising and blanking pulses, or timing pulses representing the leading edges of the synchronising and blanking pulses of this waveform, are fed to control the synchronisation of the picture generating equipment at at least one other picture generating unit which is provided with means for separating and/or regenerating the synchronising and blanking pulses required at that unit from the pulses of the combined waveform.

In order that the invention may be more fully understood, reference will now be made to the accompanying drawings in which:

FIGURE 1 is a diagram of one embodiment of television pulse waveform distribution system according to this invention, and FIGURE 2 is a diagram of one embodiment of the invention as applied to the synchronisation of a plurality of television outside broadcast units.

The system of FIGURE 1 is intended for the distribution of combined television pulse waveforms from any one of up to five pulse waveform generators, some of which may operate at different television scanning standards to the others, to a number of positions in one or more television studios at which synchronising and blanking pulse waveforms are required. One of the pulse waveform generators and its output circuit is shown to the left of the figure whilst one of the regenerator circuits located at one of the positions in one of the studios is shown to the right of the figure.

The mixed synchronising signals and mixed blanking signals from the television pulse waveform generator 1 are resistively combined at the output of the transistor combining circuit 2 by the resistive signal dividing network 3. This combined television pulse waveform is shown at W. This combined signal is fed to one pole of a five-position selector switch 4. It will be understood that the outputs of four other television pulse waveform generators, some of which may operate according to different television scanning standards, are connected to the other four poles of this switch whereby selection may be made from the outputs of any of the television pulse waveform generators.

The combined synchronising and blanking pulse waveforms from the selected television pulse waveform generator is fed over the coaxial line 5 to the regenerator circuit where it is applied to the blanking pulse separator 6 and synchronising pulse separator 7. The leading edge of the pulse output from the synchronising pulse separator is fed through an inverter stage 8 to trigger a monostable multivibrator 9 having a timing period in excess of half a line period on the lowest frequency television standard that is employed in the system. The leading edge of the output of this multivibrator triggers a further monostable multivibrator 10 having a timing period equal to the duration of the common line driving pulses that have been chosen for the various scanning standards of the system. The output from this second multivibrator is fed to an output amplifier 11 to provide the line drive signal. By this means the twice line frequency information in the synchronising waveform, which is not in fact needed for the generation of television pictures, is eliminated and the risk of mistiming occurring by the presence of these twice line frequency pulses is avoided.

The mixed synchronising signal is also fed through a delay device 12 comprising a delay line, and an emitter follower 13 to an output amplifier 14 to provide the mixed synchronising signal output.

The separated pulses representative of the mixed blanking signal are fed from the blanking pulse separator 6 through a delay device 15 comprising a delay line, and an emitter follower 16 and inverter 17 to an output amplifier 18 to provide the mixed blanking signal.

The purpose of the delay devices 12 and 15 is to preserve the correct time relationship of the various portions of the pulse waveform at the output of the regenerator circuit in co-relation with all of the remaining signals.

In order to produce the field driving pulses, the leading edge of the blanking waveform at the output of emitter follower 16 is used to trigger a monostable multivibrator 19 having a timing period greater than the longest line blanking period of the various scanning standards to be handled by the circuit. The output of this multivibrator is connected to one side of a coincidence gate 20 the other side of which is fed with the pulses representative of the mixed blanking signal. The trailing edge of the multivibrator output will be blocked by the nonexistence of blanking pulses during the active frame period but will be passed by the gate during the field blanking periods. This signal is fed via an inverter 21 to trigger a monostable multivibrator 22 which forms the field drive pulses, the timing of the pulses being chosen to be common and suitable for all of the scanning standards to be handled by the regenerator circuit. The output from multivibrator 22 is fed through amplifier 23 to provide the field drive pulses.

The regenerator circuit also includes means for producing burst gating pulses for use in colour television systems. These pulses are generated by control pulses derived from the leading edge of the line drive signals which are fed through a delay circuit 24 and which are gated out by the appropriate field waveforms in circuit 25 to control the burst gate pulse generator 26, whose output is fed through amplifier 27.

FIGURE 2 shows an embodiment of the invention by means of which two outside broadcast camera units may be combined so that all of the cameras operated by both of the units are in synchronism. It is at present normal practice where two outside broadcast units are working together to feed the output of one unit into the other which is regarded as the master unit. In order to achieve synchronism of all of the cameras the synchronising equipment in the master unit is slaved or gen-locked to the first outside broadcast unit, but this operation is costly since it requires a large amount of equipment. By employing the signal distribution system according to the present invention, it is possible to dispense with the necessity to provide a synchronising pulse generator and a slaving unit at the master outside broadcast unit. Referring to FIGURE 2, the outside broadcast unit A is provided with a television pulse waveform generator and the composite waveform from the first outside broadcast unit, which waveform comprises video signals, as well as line and field synchronising pulses and blanking pulses, is fed by means of a microwave or cable link L to a regenerator circuit R constructed as described with reference to FIGURE 1 and associated with the second outside broadcast unit B. The circuit R produces, from the composite waveform, the line drive pulses, the field drive pulses, and the mixed synchronising pulses and mixed blanking pulses which are required to operate the second outside broadcast unit B. As there will be a time delay in the passage of the synchronising waveforms through the regenerator circuit this is compensated by the addition of an adjustable delay line D in the path of the composite video signal received from the first outside broadcast unit. The video signals from the two outside broadcast units may be fed to a vision mixer M where the signals are combined. The output from the vision mixer is then fed to a transmitting station or other desired location by means of a microwave or cable link.

If it is desired to operate more than two outside broadcast units in synchronism, then the combined outputs of the first two units can be fed to a third unit where the synchronising signals for operating its cameras or other picture generating equipment are derived from a further regenerator circuit associated with the third unit. The same principles may be applied to arrange any number of outside broadcast units in series to enable a multiplicity of cameras or other picture generating devices to be driven from one common television pulse waveform generator.

Whilst particular embodiments have been described, it will be understood that various modifications may be made without departing from the scope of this invention. Thus the system may be employed for distributing pulse waveforms at other scanning standards besides those specifically mentioned.

We claim:

1. A system for the distribution of plural trains of combined pulses, each train being representative of a television scanning standard, comprising means for generating said plural trains of pulses each of which comprises the various synchronising and blanking pulses required at one scanning standard, distribution means for selectively feeding said plural trains of combined pulses to a plurality of positions each of which positions includes means for separating the constituent pulses from the selected combined pulse train and means for producing synchronising and blanking pulses according to the television standards of the selected train of pulses fed to that position.

2. A system as claimed in claim 1, in which the combined television pulse waveform representative of the synchronising and blanking pulses at any one particular television scanning standard is obtained by simple addition of various component pulse waveforms.

3. A system as claimed in claim 1, in which any desired combined television pulse waveform is selectively fed to any position through selector switch means.

4. A system as claimed in claim 1, wherein at each position a circuit is provided for separating the synchronising pulses and blanking pulses from each other, and includes means employing the separated synchronising pulses for producing the line drive pulses and the mixed synchronising pulse waveform, and means employing the separated blanking pulses for producing the field drive pulses and the mixed blanking pulses.

5. A system as claimed in claim 4, wherein for use with a colour television waveform, means are provided for producing a train of control pulses from the line drive pulses and the mixed synchronising pulses.

6. A system as claimed in claim 1, comprising a plurality of television pulse waveform generators each generating the various synchronising and blanking pulses required at a particular television scanning standard, a separate combining circuit connected to the output of each waveform generator for combining the pulse trains from the waveform generator to produce a combined pulse waveform, selector switch means having a plurality of input poles and means connecting one combining circuit to each of the poles of the selector switch means whereby the output from any one of the waveform generators may be selected by operation of the selector switch means.

7. A system for the distribution of television pulse waveforms, comprising means for generating timing pulses representing the leading edges of the various synchronising and blanking pulses required for at least one particular television scanning standard, means for combining said timing pulses into a combined pulse waveform, means for distributing said combined pulse waveform to a plurality of positions at each of which the pulses are required, and means provided at each of said positions for regenerating the synchronising and blanking pulses required at that position from the timing pulses of the combined waveform.

8. A system for the distribution of plural trains of combined pulses, each train being representative of a television scanning standard, comprising means for generating plural trains of timing pulses each representing the leading edges of the synchronising and blanking pulses required at one scanning standard, distribution means for selectively feeding said plural trains of timing pulses to a plurality of positions each of which positions includes means for separating the constituent timing pulses from the selected combined pulse train and means for regenerating synchronising and blanking pulses according to the television standards of the selected train of timing pulses fed to that position.

9. A system as claimed in claim 7, wherein one common pulse duration is used for representing the line drive signals of all of the scanning standards to be provided by the system.

10. A system as claimed in claim 7, in which one common pulse duration is used for representing the field drive signals of all of the scanning standards to be provided by the system.

11. A system as claimed in claim 7, in which the combined television pulse waveform comprising timing pulses representative of the synchronising and blanking pulses at any one particular television scanning standard is obtained by simple addition of the various component timing pulses.

12. A system as claimed in claim 8, in which any desired composite pulse waveform is selectively fed to any position through selector switch means.

13. A system as claimed in claim 8, wherein at each position a circuit is provided for separating the timing pulses representative of the synchronising pulses and the blanking pulses from each other and includes means employing the separated timing pulses representative of the leading edges of the synchronising pulses for producing the line drive pulses and the mixed synchronising pulse waveform, and means employing the timing pulses representative of the leading edges of the blanking pulses for producing the field drive pulses and mixed blanking pulses.

14. A system as claimed in claim 13, wherein for use with a colour television waveform, means are provided for producing a train of control pulses from the line drive pulses and the mixed synchronising pulses.

15. A system as claimed in claim 7, comprising a plurality of television pulse waveform generators each generating timing pulses representing the leading edges of the various synchronising and blanking pulses required at a particular television scanning standard, a separate combining circuit connected to the output of each waveform generator for combining the timing pulse trains from the waveform generator to produce a combined pulse waveform, selector switch means having a plurality of input poles and means connecting one combining circuit to each of the poles of the selector switch means whereby the output from any one of the waveform generators may be selected by operation of the selector switch means.

16. A system for achieving synchronisation between at least two television picture generating units, each unit having at least one television picture generating device, comprising a television pulse waveform generator provided at one picture generating unit and means for producing a composite television waveform comprising video signals, synchronising pulses and blanking pulses at that unit, means for feeding the composite television waveform from that unit to control the synchronisation of the at least one picture generating device at at least one other picture generating unit, and means at each of said at least one other picture generating units for separating the synchronising and blanking pulses required at that unit from the pulses of the composite waveform.

17. A system for achieving synchronisation between at least two television picture generating units, each unit having at least one television picture generating device, comprising a television pulse waveform generator provided at one picture generating unit and means for producing a composite television waveform consisting of video signals and timing pulses representative of the leading edges of the synchronising pulses and blanking pulses at that unit, means for feeding the composite waveform from that unit to control the synchronisation of the at least one picture generating device at at least one other picture generating unit, and means at each of said at least one other picture generating units for regenerating the synchronising and blanking pulses required at that unit from the timing pulses of the composite waveform.

18. A system for the distribution of plural trains of combined pulses which are each representative of one television scanning standard and each of which consists of the various synchronising and blanking pulses required at that scanning standard, comprising a plurality of pulse waveform generators each generating the combined pulses at one television scanning standard, selector switch means having a number of poles, means for connecting the output from each of the pulse waveform generators respectively to one of the poles of the selector switch means, a distribution cable connected to the selector switch means through which the pulse waveform selected by said selector switch means may be fed, a regenerator circuit connected to the output of said distribution cable for regenerating a combined television pulse waveform at the selected television scanning standard, said regenerator circuit comprising a blanking pulse separator for separating out the blanking pulses, a synchronising pulse separator for separating out the synchronising pulses, a monostable multivibrator fed by the separated synchronising pulses, said multivibrator having a timing period in excess of half a line period on the lowest frequency television standard that is employed in the system, a further monostable multivibrator triggered by the output from the first multivibrator and having a timing period equal to the duration of the line driving pulses, an output amplifier fed from said second multivibrator and means for deriving line driving signals from the output amplifier, means for feeding the mixed synchronising signal through a delay device to an output amplifier to provide the mixed synchronising signal output, means for feeding the output from the blanking pulse separator through a delay device and means for feeding the output of the delay device to an output amplifier whose output provides the mixed blanking signal, means for feeding the separated blanking pulses to trigger a further monostable multivibrator having a timing period greater than the longest line blanking period of the various scanning standards to be handled by the circuit, a coincidence gate fed with the output from said further multivibrator, means for feeding pulses representative of the mixed blanking signals to the coincidence gate, means for feeding the output from the coincidence gate to trigger another monostable multivibrator which forms the field drive pulses, an output amplifier fed from the last mentioned multivibrator and means for deriving the field drive pulses from said output amplifier.

References Cited

UNITED STATES PATENTS 3,272,919 9/1966 Thompson ---------- 178—7.1

FOREIGN PATENTS 798,552 7/1958 Great Britain.

JOHN W. CALDWELL, *Acting Primary Examiner.*

R. L. RICHARDSON, *Assistant Examiner.*